No. 676,858. Patented June 18, 1901.
M. ARNDT.
APPARATUS FOR ASCERTAINING THE DENSITY OF GAS.
(Application filed May 1, 1895.)
(No Model.)
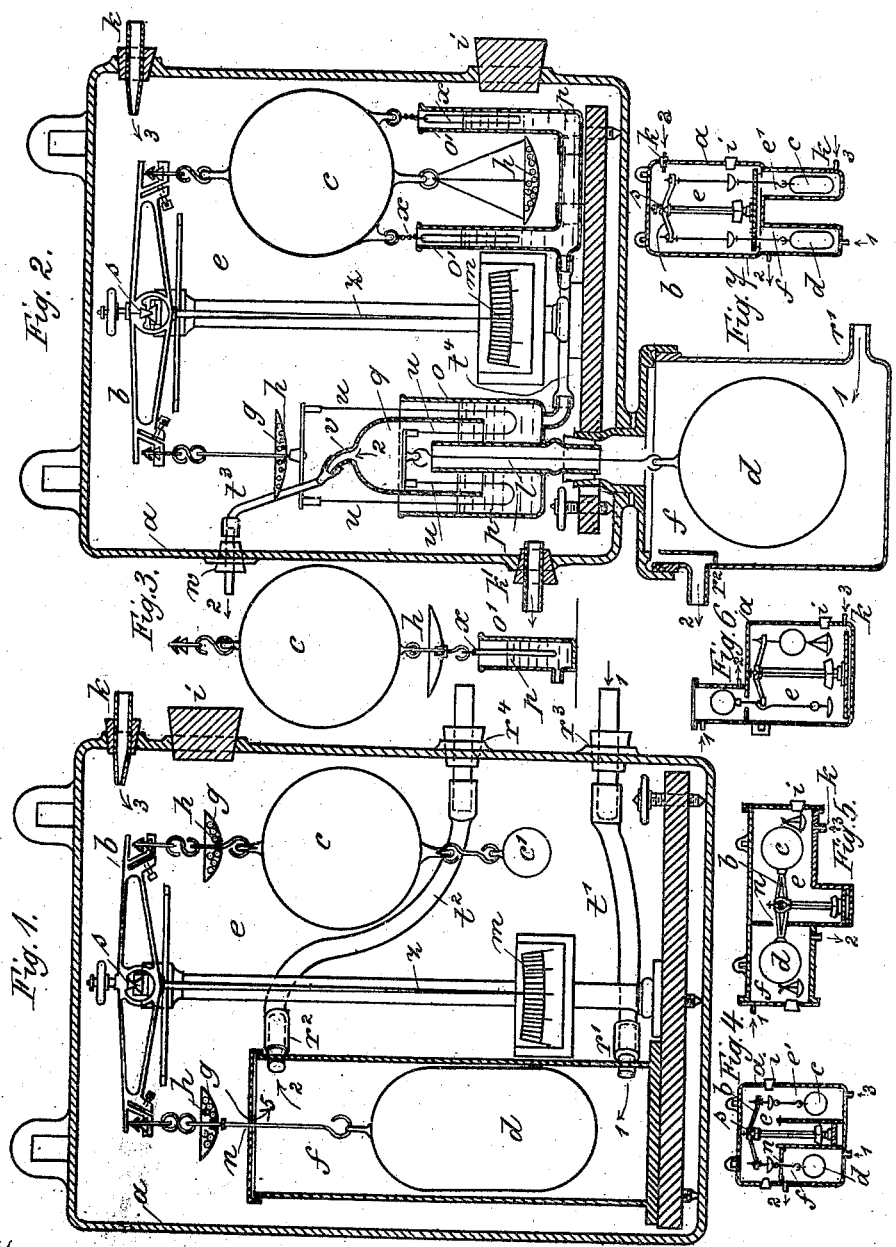
Witnesses
Inventor
Max Arndt
per Heinrich Lade
Attorney

UNITED STATES PATENT OFFICE.

MAX ARNDT, OF AIX-LA-CHAPELLE, GERMANY.

APPARATUS FOR ASCERTAINING THE DENSITY OF GAS.

SPECIFICATION forming part of Letters Patent No. 676,858, dated June 18, 1901.

Application filed May 1, 1895. Serial No. 547,813. (No model.)

*To all whom it may concern:*

Be it known that I, MAX ARNDT, a subject of the German Emperor, residing in Aix-la-Chapelle, in the Kingdom of Prussia, Germany, have invented certain new and useful Apparatus for Ascertaining the Density of Gas; and I do hereby declare that the following is a full, clear, and exact description of the invention, which will enable others skilled in the art to which it appertains to make and use the same.

This invention has been patented in the following countries and in no others: Great Britain, No. 6,211, dated May 26, 1896; Belgium, No. 114,851, dated April 16, 1895; France, No. 246,203, dated July 11, 1895; Austria-Hungary, dated August 16, 1895, and Germany, No. 96,723, dated February 7, 1898.

This invention relates to gas-balances in which one weighing or balancing part of the balance is suspended in the air-space of the gas-balance and the other weighing part is suspended in the gas to be weighed, the weight of the gas being made known by the movements of this latter weighing part, which are communicated to it by reason of the difference between the specific gravity of the gas to be weighed and atmospheric air.

The apparatus of the invention consists of a gas-balance in which two weighing parts are in connection with a balance-beam, one of said parts being suspended in air and the other in the gas to be weighed, the latter being inclosed in a gas vessel through which the gas to be weighed is caused to pass. The gas-balance is inclosed in an air-tight case.

In the accompanying drawings, Figure 1 is a sectional view of the gas-balance; Fig. 2, a similar view of a modified form thereof; Fig. 3, a sectional view of a weighing or balancing part. Figs. 4, 5, 6, and 7 are sectional views, on a smaller scale, of various modified forms of the gas-balance.

In the construction shown in Fig. 2 the gas vessel is located underneath the closed case containing the balance and is shut off from the case by a water seal.

In Fig. 4 there is a special air-container contiguous to the gas vessel.

In Fig. 5 the weighing or balancing parts are rigidly attached to the balance-beam.

In Fig. 6 the gas vessel is located above the balance-case.

In Fig. 7 the gas vessel and a special air vessel are placed underneath the balance-case.

$a$ is an air-tight case, which may be furnished with one or more panes of glass; $b$, the beam of a balance placed within the case $a$; $c$ $d$, weighing or balancing parts in connection with the balance-beam; $e$, the air-space in which the weighing part $c$ is suspended; $f$, the gas vessel in which the weighing part $d$ is suspended and through which the gas to be weighed is caused to pass.

$c'$ is an attachment for adjusting or adding to the volume of part $c$.

$e'$, Figs. 4 and 7, is a special air-container surrounding the weighing or balancing part $c$.

$g$ represents bowls or trays for the reception of small weights $h$ for placing in equilibrium the suspended parts of the gas-balance.

$i$ represents plugs for closing apertures in the case $a$, by which access is obtained to the weighing parts for placing them in equilibrium.

$k$ is a nozzle filled with wadding and serving for the admission of fresh air to the case $a$, $m$ a scale-plate, and $n$ an orifice in the gas vessel $f$, through which passes the rod carrying the weighing part $d$.

$r'$ $r^2$ are respectively an inlet and an outlet orifice of the gas vessel $f$, which orifices are in communication through tubes $t'$ $t^2$ with inlet $r^3$ and outlet $r^4$ in the side of the case $a$, the gas to be weighed entering the gas vessel at $r'$ and leaving it at $r^2$.

$z$ is a pointer fixed at one end to the beam $b$, while its free end extends over the scale-plate $m$.

In the gas-balance shown in Fig. 2 the gas vessel $f$ is shut off from the air-space $e$ of the casing $a$ by a liquid seal for the purpose of preventing any mixing of gas and air. In this case the gas vessel is provided with a pipe $l$, surrounded by a vessel $o$, in which latter is placed the liquid seal $p$. $q$ is a bell-shaped receiver dipping into the liquid seal, so as to completely shut off the gas to be weighed from the air-space $e$ of the gas-balance. The fluctuations of the weighing part $d$ are carried over to the beam $b$ through the suspension-frame $u$. In order that the weighing operation may not be affected by the varying quantities of the liquid $p$ displaced in the up and down movements of the suspension-frame $u$, there may be arranged at the other side of the prism $s$—for example, underneath the weighing part $c$—containers $o'$ $o'$, supplied with liquid of the same kind as that in vessel $o$, said containers being in communication with one another and also in any suitable manner—by a tube $t^4$, for example—with the vessel $o$, and to the weighing part $c$ are suspended the frames $x$, so as to dip into the liquid of the containers $o'$.

The aggregate cross-sectional area of the dipping-frames $x$ is, with a beam $b$ having arms of equal length, the same as that of the dipping-frame $u$, so that the latter in the oscillation of the beam $b$ displaces in the vessel $o$ just so much of the liquid $p$ as the frames $x$ displace in the containers $o'$, or inversely, the level of the liquid in the several vessels always being the same. With the arms of beam $b$ of unequal length the aggregate cross-sectional area of the dipping-frames $x$ differs from that of the frame $u$ in proportion to the difference in the length of said arms.

In Fig. 3 an arrangement is shown of only one dipping frame or rod $x$ and one corresponding liquid container $o'$.

In order that the gas shall not remain stationary in the pipe $l$ and receiver $q$, the latter is provided with an orifice $v$, which is in connection by a tube $t^3$ with an orifice $w$ in the side of the case $a$. This orifice $w$, as also the orifice $r^2$ in the gas vessel $f$, is in connection with the gas-discharge pipe or with the gas-supply pipe. Consequently in the construction shown in Fig. 2 the gas may be caused to flow through the gas vessel $f$, the pipe $l$, and the receiver $q$ either in the direction of the arrows 1 2 from below upward or, inversely, from above downward.

The air-nozzle $k'$ is always in communication with the discharge-pipe, so that in all parts of the gas-balance there is an equal pressure and no fluctuations of pressure to affect the weighing of the gas.

In performing the weighing operation the pointer $z$ is placed at zero on the scale $m$, when in all parts of the gas-balance, including the gas vessel $f$, there is air. Gas of a greater specific gravity than that of air is then caused to pass into the gas vessel $f$. The weighing or balancing part $d$ will then be driven upward and the pointer $z$ moved from the right to the left, which movement may be read direct from the scale $m$. When lighter gases are conducted through the gas vessel $f$, the movement of the pointer takes place in an opposite direction. Generally the gases to be weighed are drawn through the gas vessel $f$ by means of a suction apparatus in the direction shown by the arrows 1 2. The depression thereupon taking place extends through the orifice $n$ to the air-space $e$ and $e'$, and this while the weighing operation is being performed causes some air to be drawn in the direction shown by arrow 3 through the nozzle $k$ into the case $a$, which thus receives a supply of fresh air when gas passes into the air-space $e$. The gas passes out of the vessel $f$, Figs. 1, 4, 5, 6, and 7, in the direction shown by arrow 2, together with some air which has entered in the direction of arrow 5; but the outlet $r^2$ is so arranged on the vessel $f$ that the weighing part $d$ is played upon only by gas unmixed with air.

In the construction shown in Figs. 1, 4, 5, 6, and 7 the orifice $r'$ is always connected to the gas-supply pipe.

What I claim as my invention, and desire to secure by Letters Patent, is—

1. A device for weighing gases passing through the same consisting of a gas vessel $f$ which, except at the small orifice through which passes the rod carrying the weighing part $d$, is closed air-tight and which is provided with an inlet and an outlet for the gases, of a weighing part $d$ held from the beam of a balance so as to be suspended in the gas, and of a weighing part $c$ held from said balance-beam so as to be suspended in the air within a case which, except at the nozzle $k$ is closed air-tight, substantially as described and shown.

2. A device for weighing gases passing through the same consisting of a gas vessel $f$ which, except at the small orifice through which passes the rod carrying the weighing part $d$, is closed air-tight and which is provided with an inlet and an outlet for the gases, of a weighing part $d$ held from the beam of a balance so as to be suspended in the gas, and of a weighing part $c$ held from said balance-beam so as to be suspended in the air within a case which except at the nozzle $k$ is closed air-tight, and of a liquid-seal device in which the gas vessel $f$ carries an open pipe $l$ surrounded by the liquid-seal vessel $o$ in which latter, U-shaped frames in connection with the body $d$, are caused to dip, substantially as described and shown.

3. A device for weighing gases passing through the same consisting of a gas vessel $f$ which, except at the small orifice through which passes the rod carrying the weighing part $d$, is closed air-tight and which is provided with an inlet and an outlet for the gases, of a weighing part $d$ held from the beam of a balance so as to be suspended in the gas, and of a weighing part $c$ held from said balance-beam so as to be suspended in the air within a case which except at the nozzle $k$ is closed air-tight, and of a liquid-seal device in which the gas vessel $f$ carries an open pipe $l$ surrounded by the liquid-seal vessel $o$ in which latter U-shaped frames $u$ in connection with the body $d$ are caused to dip, and in which liquid-seal device frames $x$ in connection with the body $c$ dip into liquid-containers $o'$ in communication with the vessel $o$, the aggregate cross-sectional area of the frames $x$ being so measured as to compensate for any difference in the length of the arms of the beam $b$ and for the variations in the movement of the frame $u$ due to the displacement of liquid upon the oscillation of the beam $b$ substantially as described and shown.

In testimony whereof I sign this specification in the presence of two subscribing witnesses.

MAX ARNDT.

Witnesses:
 JOHN HACKMANNS,
 W. C. EMMET.